United States Patent [19]

Cheung et al.

[11] Patent Number: 5,812,531
[45] Date of Patent: Sep. 22, 1998

[54] METHOD AND APPARATUS FOR BRIDGING WIRELESS LAN TO A WIRED LAN

[75] Inventors: Roger Y. M. Cheung, Scarborough; Peter E. Reissner, Belleville, both of Canada

[73] Assignee: International Business Machines Corporation, Armonk, N.Y.

[21] Appl. No.: 505,928

[22] Filed: Jul. 24, 1995

[30] Foreign Application Priority Data

Jul. 29, 1994 [CA] Canada ................................. 2129199

[51] Int. Cl.$^6$ ................................. H04B 7/26; H04Q 7/20
[52] U.S. Cl. .................. 370/255; 370/331; 370/312; 370/401; 455/439; 455/445
[58] Field of Search .................. 370/94.1, 94.3, 370/95.1, 85.13, 85.14, 254, 255, 256, 257, 400, 401, 410, 312, 328, 331, 332, 338; 455/33.1, 33.2, 33.4, 438, 439, 445; 395/200.5, 200.51, 200.68

[56] References Cited

U.S. PATENT DOCUMENTS

| | | | |
|---|---|---|---|
| 5,159,592 | 10/1992 | Perkins | 370/338 |
| 5,181,200 | 1/1993 | Harrison | 370/95.1 |
| 5,210,753 | 5/1993 | Natarajan | 370/338 |
| 5,212,806 | 5/1993 | Natarajan | 455/33.2 |
| 5,321,542 | 6/1994 | Freitas et al. | 370/338 |
| 5,325,362 | 6/1994 | Aziz | 370/95.1 |
| 5,339,316 | 8/1994 | Diepstraten | 370/85.13 |
| 5,371,738 | 12/1994 | Moelard et al. | 370/338 |
| 5,384,826 | 1/1995 | Amitay | 370/338 |
| 5,394,436 | 2/1995 | Meier et al. | 370/338 |
| 5,400,338 | 3/1995 | Flammer, III | 370/225 |
| 5,412,654 | 5/1995 | Perkins | 370/94.1 |
| 5,453,977 | 9/1995 | Flammer, III et al. | 370/254 |
| 5,479,400 | 12/1995 | Dilworth et al. | 370/331 |
| 5,490,139 | 2/1996 | Baker et al. | 370/94.3 |
| 5,570,084 | 10/1996 | Ritter et al. | 340/825.05 |

*Primary Examiner*—Min Jung
*Attorney, Agent, or Firm*—Joscelyn G. Cockburn

[57] ABSTRACT

An internetworking node for providing internetworking services for mobile wireless nodes is disclosed. Each mobile wireless node is registered with at the most one internetworking node. Each mobile wireless node emits a topology broadcast identifying itself and other nodes it has heard. Each internetworking node uses these topology broadcasts to construct a table tracking each mobile node within its range, whether that mobile node is registered to that internetworking node and also a list of which other nodes that mobile wireless node can hear. The internetworking node determines which of these wireless nodes it will register. The internetworking node will then act for all wireless nodes registered to it in relaying messages between wireless nodes or between a wired LAN and the wireless nodes.

17 Claims, 9 Drawing Sheets

| FIRST TIER | REGISTERED | SECOND TIER |
|---|---|---|
| A | YES | AP1 |
| B | YES | C, E, AP1, AP2 |
| E | YES | B, AP1 |
| | | |

AP1

| FIRST TIER | REGISTERED | SECOND TIER |
|---|---|---|
| B | NO | C, E, AP1, AP2 |
| D | YES | AP2 |
| | | |

METHOD AND APPARATUS FOR BRIDGING WIRELESS LAN TO A WIRED LAN

FIELD OF THE INVENTION

This invention pertains to wireless networks generally, and means for connecting wireless nodes or wireless LANs to wired LANs in particular.

BACKGROUND OF THE INVENTION

Local Area Networks (LANs) have historically consisted of nodes interconnected by physical telecommunications media (eg, coaxial cable, twisted pair wire, or fiber optics). We shall refer to such LANs as wired LANs.

Recently wireless LANs, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter (which includes a transmitter/receiver and control card), such as an IR wireless Adapter, the mobile nodes can move around and remain connected to the network, provided they do not move out of range.

One method of implementing a wireless LAN is similar to a cellular phone network system. In this method wireless mobile nodes do not communicate directly with each other, but rather send all signals to a central base station, which then redirects the signals to the destination node.

However, in certain situations, it is advantageous to allow each wireless node to communicate directly with other nodes, as is the case in most wired LANs. In a wireless LAN which permits this, the wireless adapter and controlling software transmit data packets which all nodes within range can hear. This permits transmitting of packets which are received but ignored by all nodes except the one(s) to which they are addressed. This which parallels the packet delivery systems of such wired LAN protocols as Ethernet. Thus, upper level network operating system software, which relies on a packet delivery system such as Novell Corporation's NETWARE (tm) can be used with such a wireless LAN. We shall refer to such a wireless LAN as a Peer-to-Peer Wireless LAN.

There is an important physical characteristic in a peer-to-peer wireless LAN that makes it very difficult to build a reliable network compared to a wired LAN. In a wired LAN, every network node is physically connected to the network and can therefore access all of the network traffic. This is often not the case with wireless LANs. Each node communicates with other nodes by means of some form of electromagnetic signal, the range of which will be limited. Each node will have an area of coverage which will be limited by such factors as type of signal, signal strength, obstacles within range, etc. In the wireless LAN, it cannot be guaranteed that every network node, which is presumably part of the same wireless network, can listen to all the network traffic. For example, if nodes A, B, and C are connected to the same wireless network, A may be able to listen to the network data sent by B but not by C. In this case, C is a "hidden node" with respect to A. If C can listen to B but not to A, then A is a hidden node with respect to C.

For proper functionality, it is desirable that a wireless LAN should also be able to connect to a wired LAN. In wireless LANs using a base station approach, the Base Station can provide such connectivity. However, there exists a need for system which can provide internetworking services between a peer-to-peer wireless LAN and a wired LAN.

There are several problems associated with a wireless LAN which complicate the implementation of a simple bridge as a means for connecting a wireless LAN to a wired LAN. The primary function of such a device would be to resend overheard wireless LAN network data that is destined for a wired node onto the wired LAN, and vice versa. Depending on the wireless medium chosen, each such device would normally have a limited range. In order to provide adequate coverage, a plurality of devices, each having some degree of overlapping area would be necessary. This would normally result in the duplication of messages received by nodes within the overlapping areas, and also on the wired LAN for messages originating from such nodes.

There exists a need for a system which solves these and related problems.

In this specification, the following terms are used.

By internetworking services, we refer to services which allow systems to communicate which could not otherwise. Typical internetworking services include relaying messages from one wireless node to another, resending messages from a wired LAN to a wireless node and resending messages from a wireless node to a wired LAN.

The internetworking node that provides such internetworking services is called an Access Point or AP. The AP is a physical device, which, in order to perform the full range of internetworking services has a wired network adapter as well as a wireless network adapter.

The physical area that a wireless node must be within to be within range of the AP is called the AP's Basic Service Area (BSA). If a mobile network node is located within the BSA of a particular AP, that wireless node will be able to receive transmissions sent by that AP.

Each wireless node also has a limited range within which it can communicate. This range is called the Dynamic Service Area (DSA) of the wireless node in this specification. Other nodes within an wireless node's DSA will normally be able to receive transmissions from the wireless node.

If the wireless nodes use the same adapter as the APs, then, all other things being equal, the wireless nodes will have the same range as the APs. However there can be differences between the BSA range of the AP and the DSA range of a wireless node. For one thing, the wireless nodes are movable. Thus their range is likely to change, depending on how their signals are affected by obstacles as they move. Also, access points, being physically connected to a wired LAN, are also connected to a supply of power. Thus, the transmitter used in an AP can be more powerful than the battery powered transmitters of the wireless nodes. If this is the case, the BSA range of an access point would normally be larger than the DSA range of a wireless node.

In this specification, we will distinguish between the BSA of an AP and the DSA of a wireless node, even if the two ranges are the same. In this specification, one wireless node is said to be able to "hear" a second mobile if it is within the DSA of the second node, so that signals sent by the second node can be received by it. Similarly, a wireless node can "hear" an AP if it is within the BSA of the AP, and an AP can "hear" a wireless node if the AP is within the DSA of that node.

A "multicast" message is a form of broadcast message, sent by a wired or wireless node, which is addressed to other nodes having the same specific group address. All other wired or wireless nodes will ignore that message.

SUMMARY OF THE INVENTION

The invention provides a method and a means for providing internetworking services to wireless nodes. The invention provides for an internetworking node which can either directly relay a message from one wireless node to another wireless node, or forward such messages indirectly by first resending them to another such internetworking node which in turn resends the message to the other wireless node. The internetworking devices themselves can communicate through the wireless medium. Preferably, such internetworking devices are interconnected by means of a wired LAN.

From a user's point of view, the invention makes such wireless nodes, as for example from a wireless LAN, and a wired LAN appear as a single logical LAN. The invention allows for integration of wireless nodes with existing wired LAN based network operating systems and network applications, by making each wireless node appear as wired network nodes to other wired network nodes when a wireless node sends data packets to a wired network node. Similarly, where a wireless node is part of a wireless LAN, the invention makes a wired network node appears as a wireless node to other wireless nodes when the wired network node sends data packets to the wireless node.

The invention provides a method and means for using one or more APs as internetworking devices which interconnect a wired LAN and wireless nodes within range of each AP, and for determining when each AP should act to transmit data between the wired LAN and wireless nodes.

The primary functions for each AP are, when appropriate, i) to resend data packets from a wireless node onto the wired LAN if the data packets cannot otherwise reach their destination (eg, if they are destined for a wired node, or are destined for a wireless node outside of the DSA of the sending node); and ii) to resend data packets, which are addressed to a wireless node, from the wired LAN to the wireless node. In the preferred embodiment, the wireless node is part of a wireless LAN. The AP, having both a wired network adapter as well as a wireless network adapter, can communicate using both the packet delivery system of the wired medium, as well as the packet delivery system of the wireless medium. Furthermore, the AP is able to convert a data packet from one system to the other.

Preferably, the APs will also redirect information between two wireless nodes which are both within the AP's range, but are hidden to each other. The invention allows for this even if the AP is not connected to a wired LAN.

To achieve these functions each AP has to determine whether the data packets are for a destination within its own BSA, and whether it is responsible for acting.

The APs use a process of registration (of the wireless nodes) to carry out these functions. Each wireless node within range of at least one AP will be registered to a single AP, even if it is within range of more than one AP. Once an AP registers a wireless node, it will act to forward data to and from the wireless node.

For example, whenever an AP overhears a directed packet on the wired LAN addressed to a wireless node, the AP will check to see if that node is registered with it. If so, the AP will forward the data packet to the node. Otherwise, the AP will ignore the packet. Similarly, whenever an AP overhears a broadcast packet on the wired LAN, it will retransmit the packet to all wireless nodes registered with it.

Each wireless node broadcasts information about itself at regular intervals. This information informs other nodes within range of the presence of the broadcasting node. The broadcast is, however, different for APs and for wireless nodes. An AP broadcasts a beacon identifying its network address. This beacon tells wireless nodes within the BSA that the AP is within range. Wireless nodes broadcast a topology broadcast message which includes both their own network address, and the address of other nodes, including APs, that they have heard during the interval since they last sent a topology broadcast message (ie, the wireless network addresses of nodes not hidden from the sending node during the interval since the last broadcast).

According to the invention, each AP uses this information to determine which wireless nodes are within its range, which other nodes are within these wireless nodes' ranges, and which wireless nodes it will register.

A broad aspect of the invention provides for an internetworking node comprising means to send data to wireless nodes and to receive data from wireless nodes; means to recognize and store received data which comprises messages from at least one wireless node containing information as to the network address of such node and the other nodes from which said can receive data; and means to cause said sending means periodically to broadcast information as to the network address of the control node.

Another broad aspect of the invention provides for a wireless node for use in a network, comprising means to send data to wireless nodes and receive data from wireless nodes; means to recognize and store received data which comprises a message from at least one other wireless node containing information as to the address of such other wireless node; and means to cause said sending means at the end of a period to broadcast its own network address and a list of the network addresses of any other wireless nodes from which it has received a said message within the period.

Another aspect of the invention provides for a method for internetworking between wireless nodes comprising the steps of sending and receiving data between wireless nodes, including internetworking nodes; recognizing and storing received data which comprises a message from at least one other wireless node containing information as to the address of such other wireless node, and broadcasting, by each wireless node, at the end of a period, its own network address and a list of the network addresses of any other wireless nodes from which it has received a said message within the period; recognizing and storing, by said internetworking nodes received data which comprises broadcast messages from wireless nodes containing information as to the network address of each such node and the other nodes from which it has received a said message within the said period.

In a preferred embodiment each AP stores the topology information collected through the "topology broadcast" messages it has received. APs also send special "beacon" messages which become part of the topology information. APs use the presence or absence of other AP wireless network addresses in the topology information to perform registration procedures. Registration procedures ensure that all wireless network nodes are registered with at most one AP. One such procedure is to use the network address of the AP to determine which AP should register the wireless node if the wireless node is within range of more than one AP. For example, if a node is within range of more than one AP, the AP with the lowest network address will register that node. APs use the topology information together with registration information to determine what action they should take in transferring data in and out of their respective BSAs.

These foregoing aspects of the invention, together with other aspects and advantages thereof will be more apparent from the following description of the preferred embodiments thereof, taken in conjunction with the following drawings.

DETAILED DESCRIPTION OF THE PREFERRED EMBODIMENT

The preferred embodiment is discussed and illustrated with respect to an example of its implementation using Infra-red (IR) wireless LANs and ETHERNET wired LANs. It should be appreciated that the invention is not limited to IR wireless LANs or ETHERNET wired LANs and could be similarly implemented in other wireless LANs and/or wired LANs.

Figure 1:
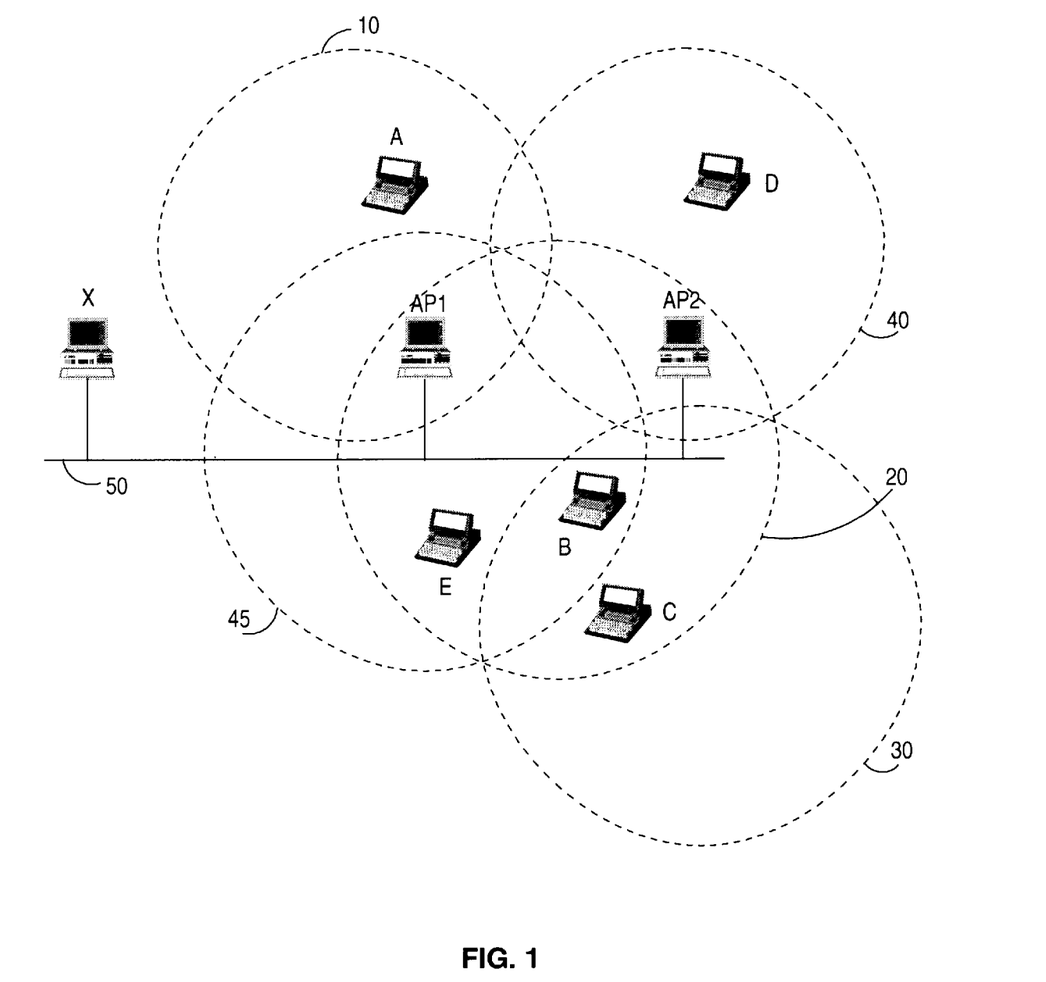
FIG. 1 schematically illustrates a configuration of wireless nodes around a wired LAN, with 2 APs acting as bridges, with the DSA of each wireless node shown in phantom.
Figure 2:
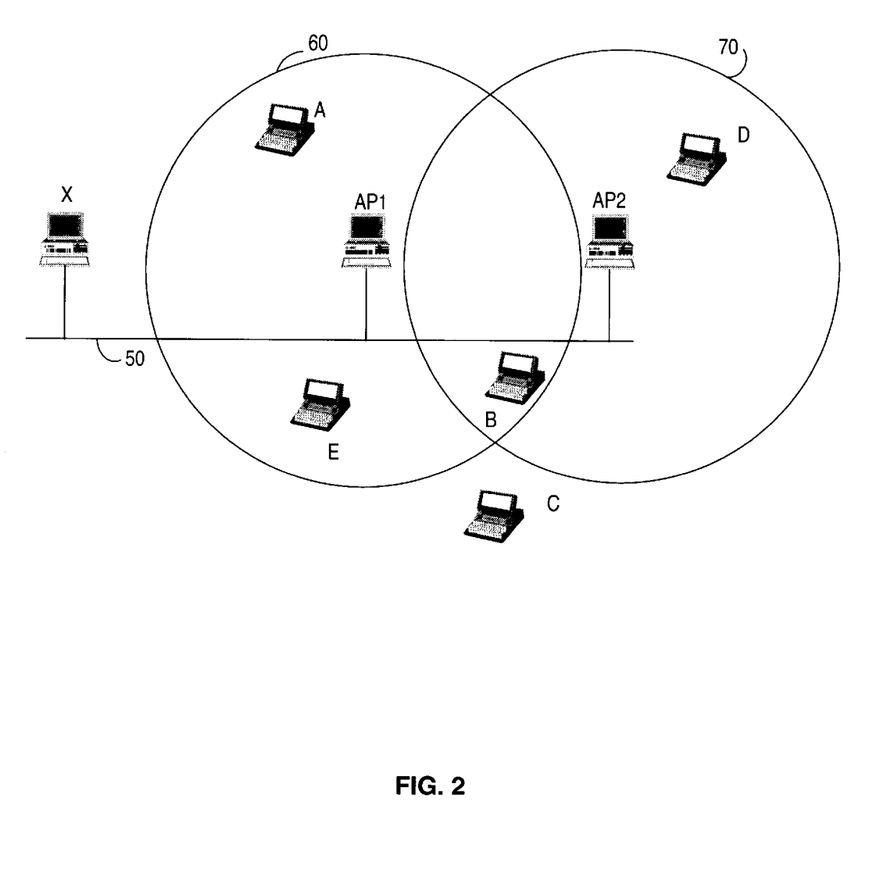
FIG. 2 illustrates schematically the same configuration as is shown in FIG. 1, but with the BSA of each AP shown in phantom.

FIG. 1 and FIG. 2 each illustrate a configuration of wireless nodes A, B, C, D and E, a wired LAN 50, wired node X and APs AP1 and AP2. Each AP is a physical device that has a wired network adapter as well as a wireless network adapter. Each AP can be a dedicated internetworking device, comprising the two adapters, a means for processing and controlling software. Alternatively it can be, for example, a user computer or workstation, which includes the two adapters and in which the controlling software runs in the background.

Using the ISO/CCITT OSI international standard terminology, the AP behaves as a layer 2 Data Link Layer entity that "bridges" between the wireless LAN and the wired LAN. To state it in another way, the AP understands both the wired LAN and wireless LAN protocols. It relays the data traffic from the wireless LAN to the wired LAN in such a way that data traffic appears to come from wired network nodes in the wired LAN. It is also capable of relaying the data traffic from the wired LAN to the wireless LAN in such a way that data traffic appears to come from wireless network nodes in the wireless LAN. Each AP functions as a transparent MAC-bridge (wherein MAC stands for Medium Access Control, as is known in the art) that connects the IR wireless nodes to the ethernet wired LAN.

In the examples discussed, the same wireless adapter is used for both the APs and the wireless nodes. Therefore the BSA range of the APs, ignoring the effect of obstacles, will be the same as the DSA ranges for the wireless nodes. As stated earlier, the AP, being physically connected to a power supply, could support a more powerful transmitter, with an extended BSA range.

FIGS. 1 and 2 are the same except that FIG. 1 illustrates the DSA ranges of the wireless nodes while FIG. 2 illustrates the BSA ranges of the APs. In FIG. 1, wireless node A has a DSA 10, wireless node B has a DSA 20, wireless node C has a DSA 30, wireless node D has a DSA 40, and wireless node E has a DSA 45.

In the IR wireless LAN, it cannot be guaranteed that every network node that is presumably part of the same wireless network can listen to all the network traffic. In FIG. 1, wireless node E can listen to the network data sent by wireless node B but not by wireless node C because wireless node E is within B's DSA 20, but is outside of C's DSA 30. In this case, E is a hidden node with respect to C. Similarly C is a hidden node with respect to E, because C is outside of E's DSA 45.

In some situations, it is possible for one IR wireless node to receive data sent by another wireless node but not be able to send to that node. For example, node Y (not shown) would be able to listen to the network data sent by node Z (not shown), but Z would not be able to receive the data sent by node Y. This situation is known as asymmetry.

Turning now to FIG. 2, the BSA of AP1 is illustrated by circle 60 whereas AP2 is shown to have BSA 70. Wireless nodes A, B and E are within the BSA 60 of AP1. Wireless node B is also within the BSA 70 of AP2, as is wireless node D. Wireless node C is not within range of either access point.

It should be noted that because node B is within range of both APs, the wired LAN will receive unwanted duplicated messages if both AP1 and AP2 resend a message from B to the wired LAN, and likewise, node B will receive unwanted duplicated messages if both AP1 and AP2 resend a message from the wired LAN to B.

To avoid such duplication the invention provides a selection mechanism for ensuring no more than one AP will act for any particular wireless node, by ensuring that every wireless node is "registered" with no more than one AP.

The preferred embodiment of the invention carries out this selection mechanism in the following manner. The AP discovers the topology of the wireless network nodes by means of processing "Topology Broadcasts" sent by wireless nodes. Then each AP carries out a "Registration" process. This "Registration" process enables each AP to decide if it should intercept the data on the wireless LAN and resend it onto the wired LAN or "Relay" the data packets to another destination on the same wireless LAN. It also enables it to decide if it should intercept data on the wired LAN and resend it to a wireless node within its BSA.

In other words, by processing the topology broadcasts of other nodes, each AP determines if it can act, ie, whether it can forward a packet to its intended destination. By the process of registration, each AP that can act determines whether it should act, or whether it should do nothing and rely on another AP to act.

"Topology Broadcast"

Every wireless network node, excluding the AP, will emit a special broadcast message called a "Topology Broadcast"

at a pre-determined interval, e.g. every 5 seconds. The content of the broadcast message contains at least the network address of the network node emitting the broadcast message.

Every AP will also emit a special broadcast, in this case called a "beacon", at a pre-determined interval, eg. every 5 seconds. The content of an AP's beacon contains the AP's wireless address.

Each wireless node maintains a list of the network addresses of wireless nodes within its range (hereafter called a node address list). Whenever a wireless node hears the broadcast message from another wireless node (the sender), the wireless node recognizes that it is within range of the sender. Therefore whenever a network node receives a "Topology Broadcast" or a "beacon", it extracts the network address of the network node that sent the broadcast message and add that address to its node address list.

The topology broadcast emitted by each wireless node also contains the network addresses of the nodes stored within its node address list. In other words, the topology broadcast emitted by each wireless node tells every network node both who the sender is and also who the sender can hear. In the scenario illustrated in FIG. 2, AP1 is the only wireless node within range of Node A, whereas Nodes E, C, AP1 and AP2 are within range (the DSA) of Node B. Consequently the "Topology Broadcast" sent out by network node A will contain the network address of node A itself and also the network address for the Access Point AP1, whereas the "Topology Broadcast" sent out by node B will contain the network addresses of nodes B, C, E and the Access Points AP1 and AP2.

These node address lists must be frequently updated because wireless nodes, being mobile, can move in and out of range of other nodes. In the preferred embodiment, each wireless node resets (ie, clears) its own "node address list" after it sends its broadcast message. The wireless node will then reconstruct its node address list from the topology broadcasts from other nodes that it subsequently hears. Therefore, during the inter-broadcast interval, e.g. 5 seconds, the "node address list" for any given node will be filled only with the network addresses of other network nodes that the network node has heard during that interval.

By listening to the Topology Broadcasts emitted by each wireless node, each AP constructs a "topology table" describing the topology of the wireless network around itself. This topology table is used to keep track of which nodes are within range of the AP. The topology table also keeps track of which other nodes are within range of each node within the AP's BSA.

There are two columns in each AP table for tracking the other wireless network nodes, called the first tier and the second tier respectively. The first tier contains the addresses of wireless nodes that the AP can hear. The second tier contains those network nodes that the first tier wireless nodes can hear. In other words, for each wireless node in the first tier, the second tier stores the addresses which the first tier wireless node stores within its node address list and broadcasts as its topology broadcast.

Figure 5:
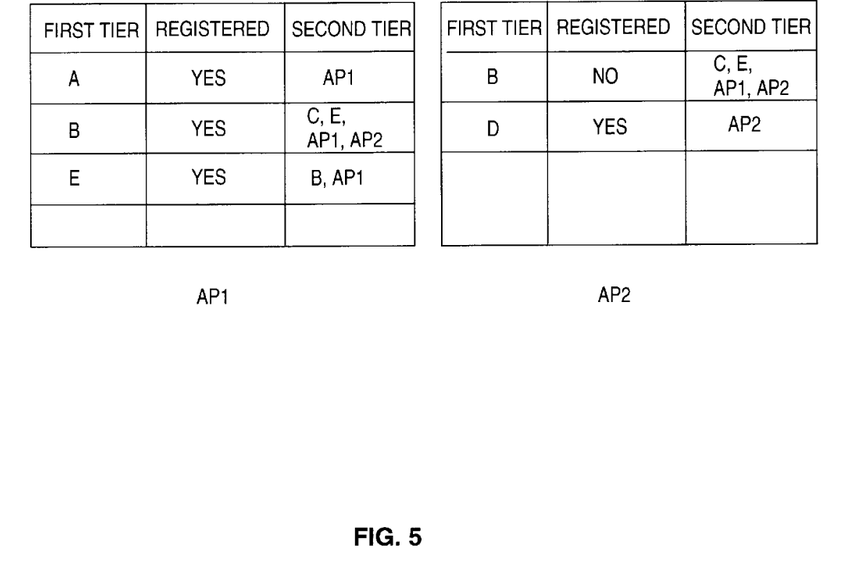
FIG. 5 is an example of the topology table maintained by the APs of FIGS. 1 and 2 for the preferred embodiment of the invention.

FIG. 5 illustrates the "topology tables" for AP1 and AP2 for this embodiment for the network setup shown in FIGS. 1 and 2.

It should be noted that no AP address appears in the first tier column of the "topology table". An AP does not broadcast a node address list, because such information is not useful to other APs. Therefore, in the preferred embodiment, the beacon sent by each AP will only contain its own wireless network address. This Beacon is not useful to another AP and will therefore not be processed by APs that receive other APs' Beacons.

The topology tables are also used by each AP to keep track of whether or not a wireless node is registered to it. The process of how an AP determines whether or not to register a wireless node is discussed below.

Another advantage of the topology broadcasts is their usefulness in performing network diagnostics. For example, it is relatively easy to determine from the "topology broadcast" which network nodes are "alive" in the network and which network nodes are hidden from which other network nodes.

Registration

Each AP is assigned a unique wireless network address with a common prefix for its wireless LAN connection. For example, the network address may be "IRAP001" where IRAP is a common prefix for all AP wireless network addresses. No wireless network node other than an AP is assigned that common prefix.

Each AP is also assigned a wired group network address for its wired LAN connection. The group address is used for sending "multicast" broadcasts. When a "multicast" message, a form of broadcast message, is sent to the AP group network address in the wired LAN, all APs, receive that message but only Aps with the AP group address copy the message. All other wired network nodes ignore that message.

Whenever AP receives a Topology Broadcast from a wireless node, the AP updates its topology table. It searches its topology table for the first tier entry for that node. If the node is already listed, the AP replaces the second tier network addresses contained in that entry with the network addresses contained in the node's Topology Broadcast (ie, the node address list for the sending wireless node). If it is not listed, it adds the entry.

The AP then determines if the sending network node can hear another AP other than itself. The receiving AP does this by determining if another AP's wireless network address is contained in the broadcast. This can be determined either from the broadcast directly or by searching its updated second tier.

If there is no other AP network address in the "topology broadcast" message, the AP concludes that the sending network node is now registered to itself. If the sending network node was "registered" at the time the "topology broadcast" was received, that is, the "registered" column in FIG. 5 stated "YES", the sending network node remains registered and no further action is taken by the AP. If the sending network node was not "registered" at the time the "topology broadcast" was received, it assumes the sending network node may have been registered to another AP. Therefore, to eliminate the possibility of duplicate registration the AP sends a "multicast" message on the wired LAN to inform all other APs that the sending network node was just registered to itself. This multicast message is called a "registration notice". When an AP receives a registration notice, the AP "deregisters" the mobile network node declared in the registration notice if that node was previously registered to itself. That is, the AP changes the registered column corresponding to that network node in its topology table to "NO".

If other AP network addresses are contained in the "topology broadcast" of the wireless node, this implies that the wireless node is within range of more than one AP. A mechanism is required for determining which AP should register the node. In the preferred embodiment, the AP with the smaller network address registers the wireless node. For example, each AP determines from its topology table whether any of the other AP wireless network addresses within range of the wireless node are smaller than its own wireless network address. If the answer is no, the AP registers the network node if it has not already done so, and sends a "registration notice", as described above, onto the wired LAN. If the answer is yes, the AP would normally "deregister" the network node, upon receiving the "registration notice" from the lower address AP, if the wireless node was "registered" previously to the higher addressed AP.

Furthermore, if an AP does not hear the topology broadcast from the network node after a pre-determined timeout period, it revises its topology table accordingly. In the embodiment illustrated in FIG. 3, the AP will erase the network node entry from its "topology table".

Figure 3:
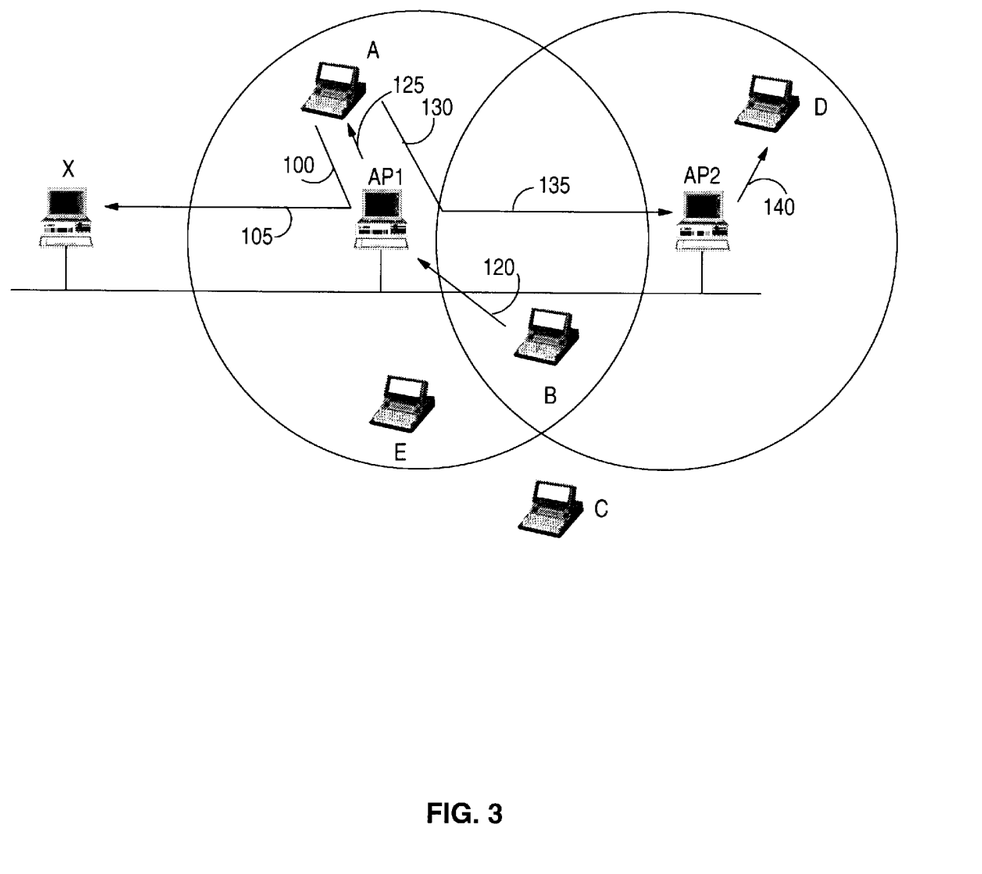
FIG. 3 illustrates schematically, for the same configuration as is shown in FIG. 2, how the preferred embodiment of the present invention could be used to relay a message from B to A, from A to D and from A to X.

Using FIGS. 2 and 3 as an example, both AP1 and AP2 receive the Topology Broadcast from wireless node B. Both APs are able to determine that node B can hear both AP1 and AP2. Since AP1 has a smaller address than AP2, AP1 registers node B. AP2, having the bigger address, does not attempt to register node B. Furthermore, if node B was previously registered to AP2 (ie, node B has moved closer to AP1), then AP2 deregisters node B upon receiving a registration notice from AP1.

Other mechanisms can be used for determining which of a plurality of APs within range of a wireless node would register the node. For example, one based on signal strength could be used.

To compensate for possible wireless transmission failure, wireless packet delivery systems usually require receiving nodes send a specific acknowledgement to the sending node, acknowledging the receipt of each data packet. For example if wireless node A sends a directed packet to wireless node B, B will in turn send a packet to A, acknowledging receipt of A's message. These acknowledgements are not normally required for packet delivery systems on wired LANs, due to the low failure rate of transmissions in such mediums.

In order to utilize existing wireless packet delivery systems, APs in the preferred embodiment of the invention impersonate the sending and receiving nodes, for the purposes of these acknowledgments. Whenever an AP acts as an intermediary and relays a packet from a sending (mobile) node to a destination (wireless node), the AP impersonates the destination node with respect to acknowledging receipt to the sending node (who expects such an acknowledgement from the destination node). The AP then impersonates the sending node with respect to resending the packet to the destination node. The destination node will then send an acknowledgement to the AP if transmission to the destination node is successful. The AP of the preferred embodiment will not inform the sending node if the transmission to the destination node is not successful. Rather, the preferred embodiment leaves it up to the upper level network operating system software (which uses an additional layer of acknowledgements) to recover from this type of transmission failure.

In operation, the process of registration prevents multiple APs from forwarding the same wireless node's packets onto the LAN, thus preventing duplication. Only the AP which has registered a wireless node will act on those packets. Furthermore, the AP is able to determine whether the message will be delivered without its intervention in the following manner. If an AP overhears a message that is sent from one of its registered first tier wireless nodes to another first tier wireless node, the AP examines its topology table to determine whether the message will be received. The AP assumes the message will be delivered without the AP's intervention if the sending network node can hear the receiving network node and the receiving network node can hear the sending network node. If this is the case, the AP will not take any action. However, if an asymmetric condition exists, for example C can hear B but B cannot hear C, the AP will intervene to relay the data packets. Note that the AP can determine whether an asymmetric condition exists by comparing its topology table entries for both nodes. However, if the destination node is not in the AP's topology table, AP cannot determine if there exists an asymmetric situation. It will assume the situation is symmetric, i.e. if the sending node can hear the destination node, AP will not intervene.

Using FIG. 3 as an example, if node B sends a message to node C, both AP1 and AP2 will check their topology tables. Since node B is not registered to AP2, AP2 will not take any action. Thus AP2 will not forward B's message onto the LAN. As for AP1, it will examine the entry associated with node B in its topology table shown in FIG. 5. The "registered" column indicates that node B is registered to AP1 which implies AP1 would be the AP that would have to act if intervention is necessary. AP1 therefore proceeds to examine the rest of the entry. Since node C is in the second tier column in that entry, the table indicates node B can hear node C. Therefore, AP1 will not take any action, because no intervention is necessary.

Again using FIGS. 3 and 5 for another example, if node B sends a message to node A, both AP1 and AP2 will overhear the message and check their "topology tables". Since node B is not "registered" to AP2, AP2 will not take any action. After AP1 examines the entry associated with node B, it determines that node B is "registered" and node A is not in the second tier column for that entry. However, node A is in the first tier column in the table. It examines the entry associated with node A. It finds out that node B is not in the second tier column in that entry. AP1 concludes intervention is necessary because it can hear node A and node B, but node B cannot hear node A and node A cannot hear node B. Therefore, AP1 relays that message to node A. The path of the data packet is shown by arrows 120 and 125.

If an AP overhears a message that is sent from one of its "registered" first tier network nodes to another network node, it checks if the sending network node can hear the receiving network node by examining its "topology table". If the sending network node cannot hear the receiving network node and the receiving network node is not one of its first tier network nodes, the AP will proceed to resend the message onto the wired LAN. In other words, if an AP does not locate a destination node within its topology table, it defaults to resending any message addressed to such a node onto the wired LAN.

Using FIGS. 3 and 5 for an example, if node A sends a message to node X, both AP1 and AP2 will check their "topology tables" as illustrated in FIG. 5. Since node A is not "registered" to AP2, AP2 will not take any action. When AP1 examines its "topology table" for the entry associated with node A, it determines node A is "registered" to AP1 and node X is not in the second tier column for node A. Thus, AP1 recognizes it needs to intervene. AP1 checks its first tier to see if node X is a wireless node within its range. AP1 does not find such an entry for X. AP1 therefore assumes node X is on the wired LAN and proceeds to resend the message on the wired LAN. The path of the data packet is illustrated by arrows 100 and 105.

Using FIGS. 3 and 5 for one more example, now let us assume node A, which is registered with AP1 wants to send a data packet to node D, which is registered with AP2. The packet sent by A will be overheard by AP1 as is shown by arrow 130. Since node A is not within node D's DSA, D is not within the second tier entry for node A in AP1's topology table. Therefore, AP1 will resend the data packet onto the wired LAN, as is shown by arrow 135. AP2 would overhear this data packet, determine node D is registered with it, and resend the data packet directly to D, as is shown by arrow 140.

Figure 4:
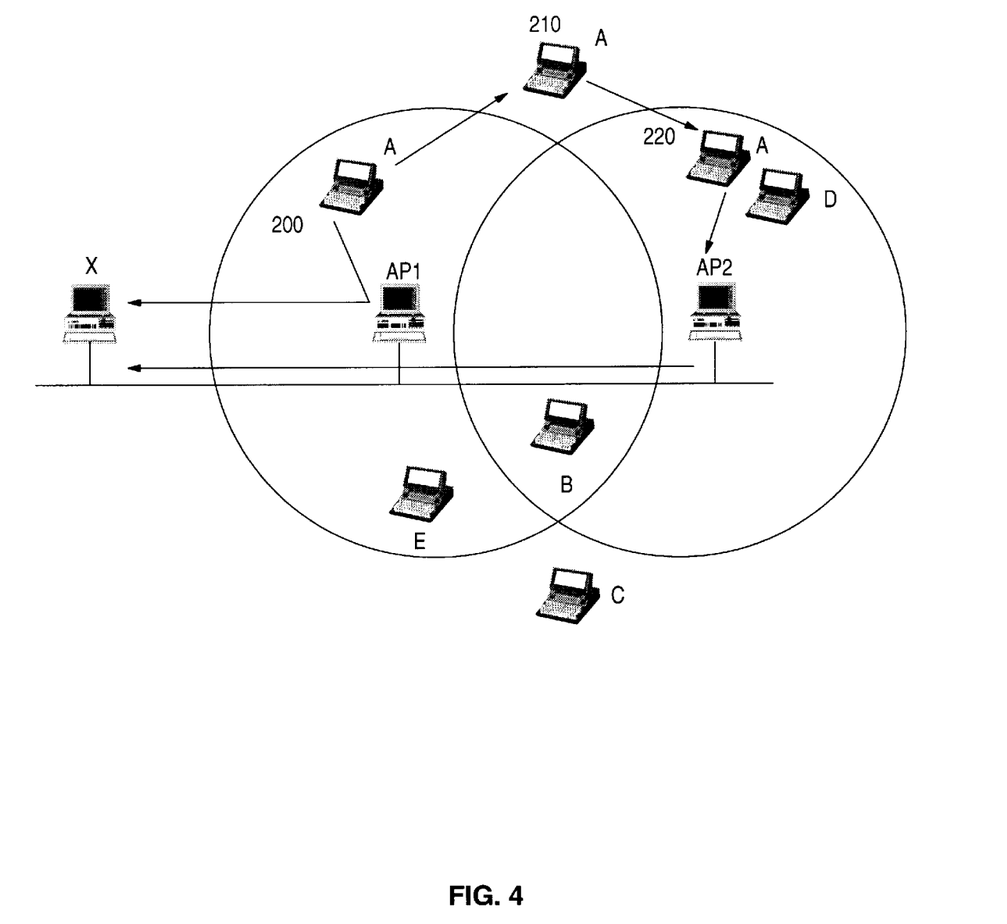
FIG. 4 illustrates schematically, for the same initial configuration as is shown in FIG. 2, node A roaming from the BSA of AP1 to the BSA of AP2.

FIG. 4 illustrates how a roaming wireless node can move in and out of different APs' BSAs. When a wireless node moves between BSAs of APs, it is deregistered with one AP and registered with another. The data packets sent by the wireless node to the wired LAN are resent by different APs depending on where the wireless node is, and which AP the wireless node is registered with. Likewise, data packets destined for the wireless node are resent by different APs depending on where the wireless node is and which AP the wireless node is registered with.

When a node roams, it may roam out of range from all APs. The wireless node will then be disconnected from the wired LAN until it again becomes registered with some AP. Of course a roaming node can not become registered with an AP until it becomes aware of the presence of the wireless node (ie, overhears either the wireless node's topology broadcast or regular transmission). Optionally, to further shorten the time between the wireless node moving into an AP's BSA and the AP detecting its existence, each wireless node could schedule its topology broadcast earlier when it first overhears an AP.

Referring to FIG. 4 by way of an example, wireless node A originally located at position 200, is registered with AP1. It therefore communicates with wired network node X via AP1. As A moves to an area which is not covered by any AP, as is illustrated as position 210, it is disconnected from the network. Its communication with X is severed until it becomes registered by another AP. Thus when as A moves into AP2's BSA, as shown at 220, and AP2 overhears it. At this point, A can again communicate with X, this time via AP2. AP2 will send a registration notice on the wire LAN, informing other APs, in this case AP1, that AP2 has now registered node A, so that AP1 should deregister it. AP1 may have already deregistered A if AP1 had not heard A after a set period of time. Assuming an entire area is sufficiently covered by APs, A can move around the area while remaining connected to the network.

It should be noted that although preferable, the two APs do not need to be connected by wire, or form part of a wired LAN in order to provide the internetworking services as illustrated in the previous examples (apart from communication with node X). Rather than resending signals onto the wired LAN, the APs can communicate between themselves through the wireless medium, provided they are within range of each other. For example, when the APs are used to allow communication between node A and node D in FIG. 3, as is illustrated by arrows 130, 135 and 140, let us assume AP1 and AP2 were not connected by means of a wire, but rather, are configured to allow wireless communication between them. In this case, AP1 directly resends the packet to any AP within range (eg, AP2) via the wireless medium. AP2 would then resend the packet to node D. In this case no wired network adapter would be required.

Figure 6:
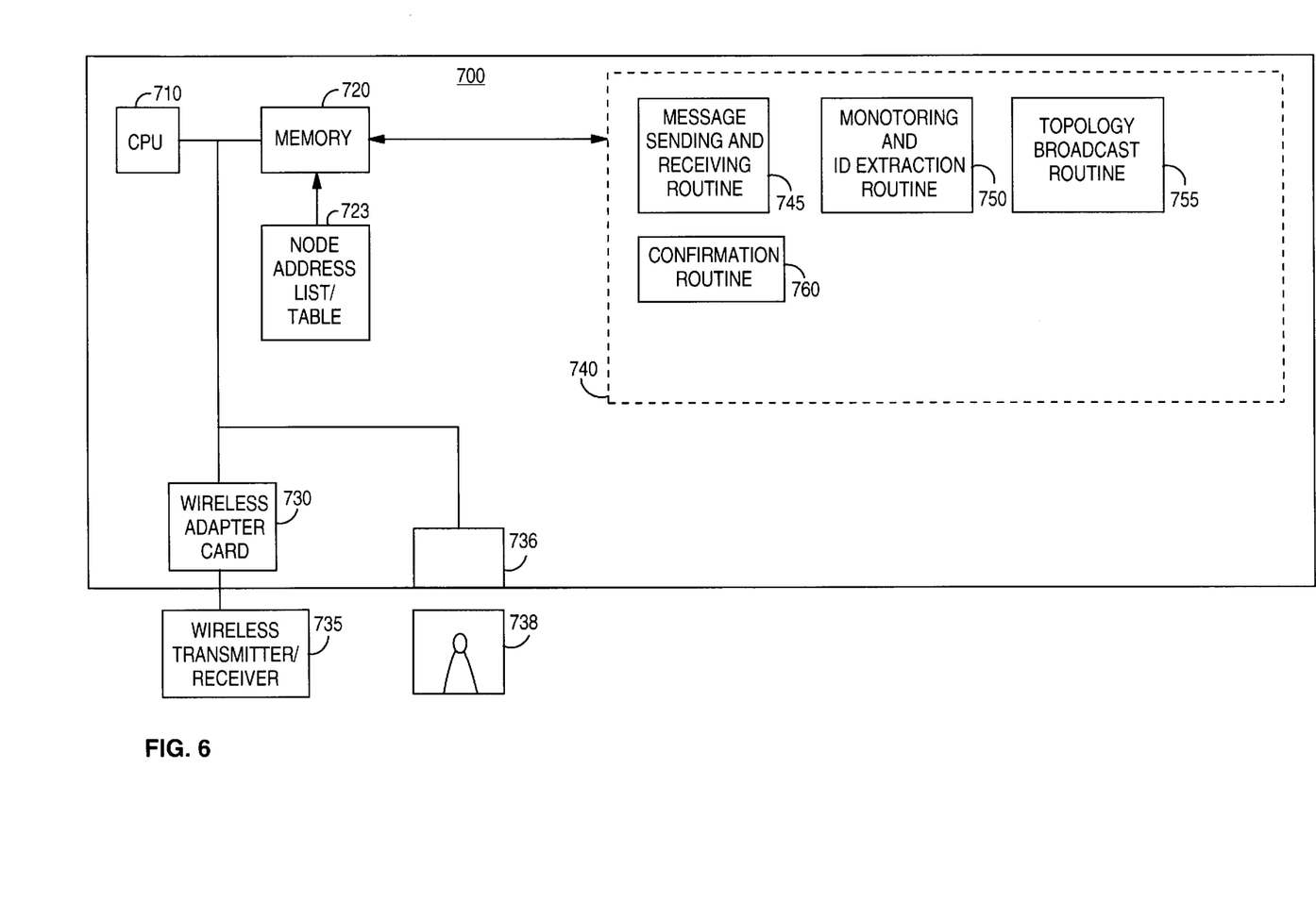
FIG. 6 is a block diagram illustrating the components of a wireless node according to the preferred embodiment of the present invention.

FIG. 6 is a block diagram schematically illustrating the components of a wireless node according to the preferred embodiment of the present invention and its associated software which carry out the above-described operations. A wireless node 700 can take the form of a laptop computer equipped with a wireless adapter card 730 and a wireless transmitter/receiver 735. The wireless adapter card/transmitter/receiver is controlled by a CPU 710 which in turn carries out instructions from the various software routines selected from those within phantom box 740 which are loaded into the node's memory 720. The node's memory 720 also maintains the node address list/table 723. The software routines 740 include a message sending and receiving routine 745; a monitoring and extraction routine 750 for extracting the addresses from overheard topology broadcasts and beacons; a topology broadcast routine 755 for constructing the node address list/table 723 from overheard topology broadcasts and beacons, and transmitting the node's topology broadcast; and a confirmation routine 760. Preferably the node includes a disc drive 736 for installing the software routine 740 from a disc 738. Alternatively, suitable circuitry for carrying out the operations can replace these software routines.

Figure 7:
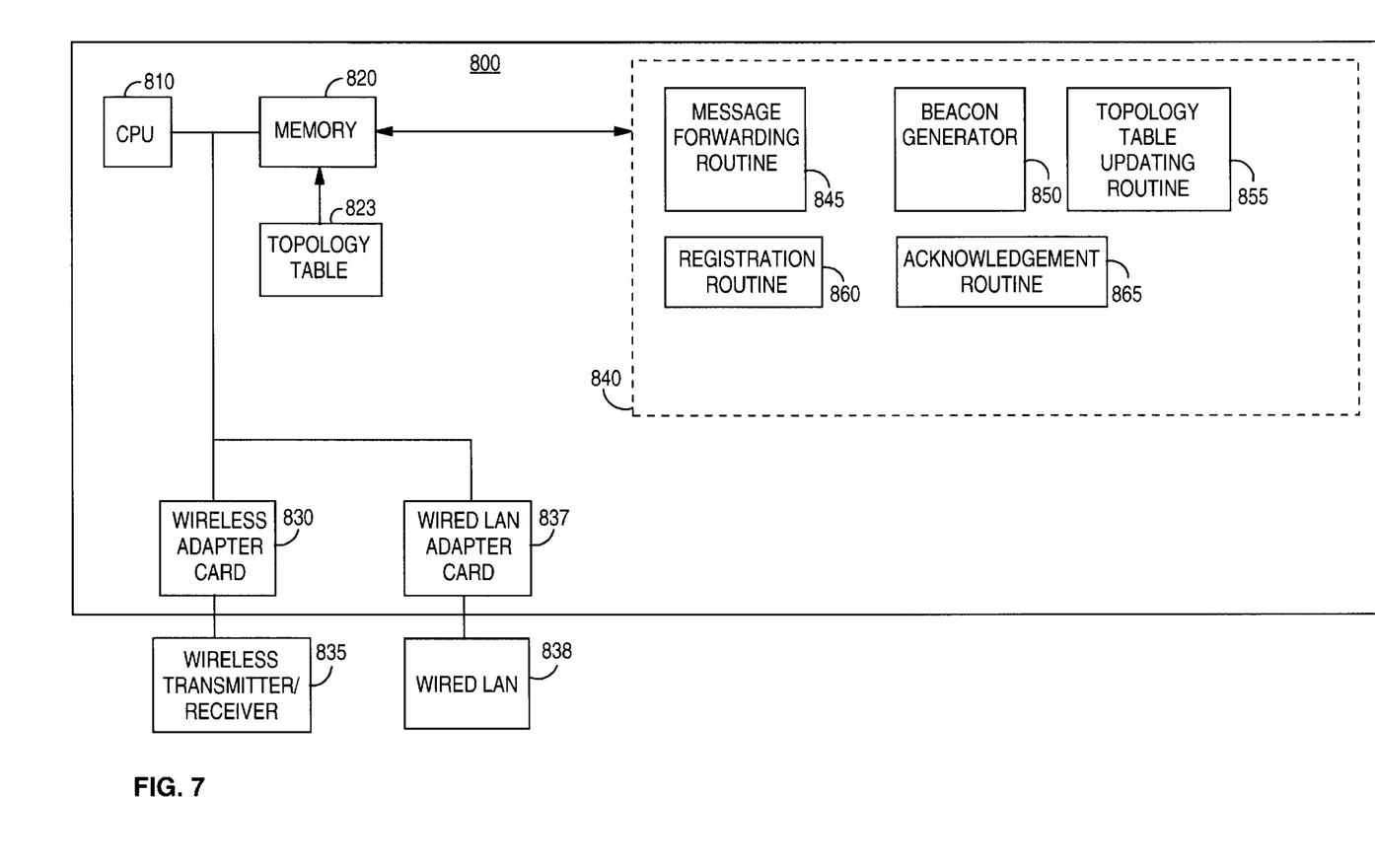
FIG. 7 is a block diagram illustrating the components of an internetworking node according to the preferred embodiment of the present invention.

FIG. 7 is a block diagram schematically illustrating the components of an internetworking node of the preferred embodiment of the present invention and its associated software for carrying out the above-described operation. An internetworking node 800 can take the form of a desktop computer equipped with a wireless adapter card 830 and a wireless transmitter/receiver 835 along with a LAN adapter card 837 for communicating with a wired LAN 838. Both the wireless and the wired adapter cards are controlled by a CPU 810 which in turn carries out instructions from the various software routines selected from those within phantom box 840 which are loaded into the node's memory 820. The node's memory 820 also maintains the topology table 823. The software routine 840 includes a message forwarding routine 845 for forwarding messages either onto the wired LAN, or to a wireless node by a wireless transmission; a beacon generator 850 for periodically broadcasting the internetworking node's address; a topology table updating routine 855 for constructing the topology table 823 from overheard topology broadcasts; a registration routine 860 for determining whether the internetworking node should register an overheard wireless node according to a hierarchy (eg. which AP has a lower address), and for registering wireless nodes, and sending registration notices to other internetworking nodes; and an acknowledgement routine 865.

Figure 8:
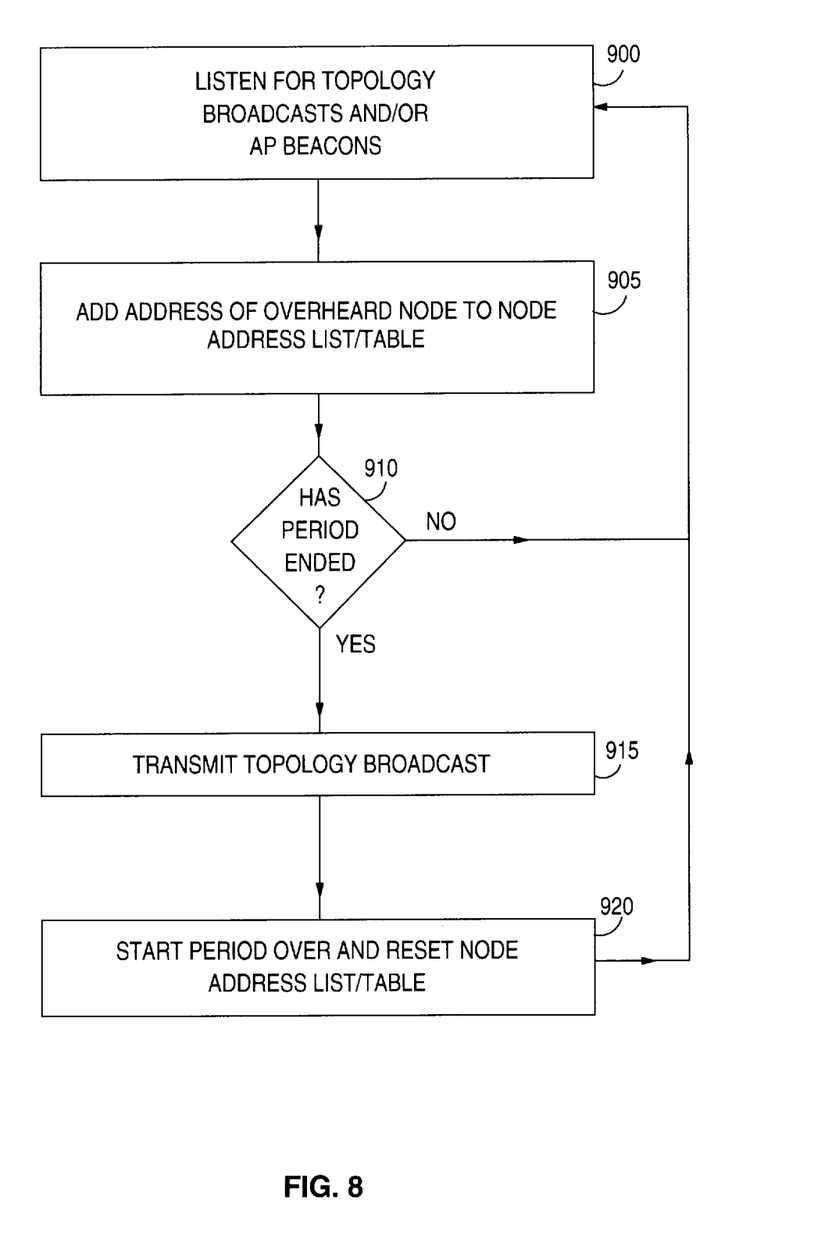
FIG. 8 is a flow chart illustrating the steps taken by a wireless node in sending its topology broadcast.

FIG. 8 is a flow chart illustrating the steps taken by a wireless node in order to periodically transmit its topology broadcast. As shown at step 900, the wireless node listens for topology broadcasts and/or AP beacons. At step 905, the wireless node then adds the address of any overheard node to its node address list/table. At step 910 the node then determines whether a predetermined period of time has expired since the node last transmitted its topology broadcast. If so, the node transmits its topology broadcast which contains its address, as well as the address of any node within its node address list, at step 915. The node then resets its clock to start the period over and also clears the entries from its node address list/table at step 920 so that the node can construct an updated node address list during the next period.

Figure 9:
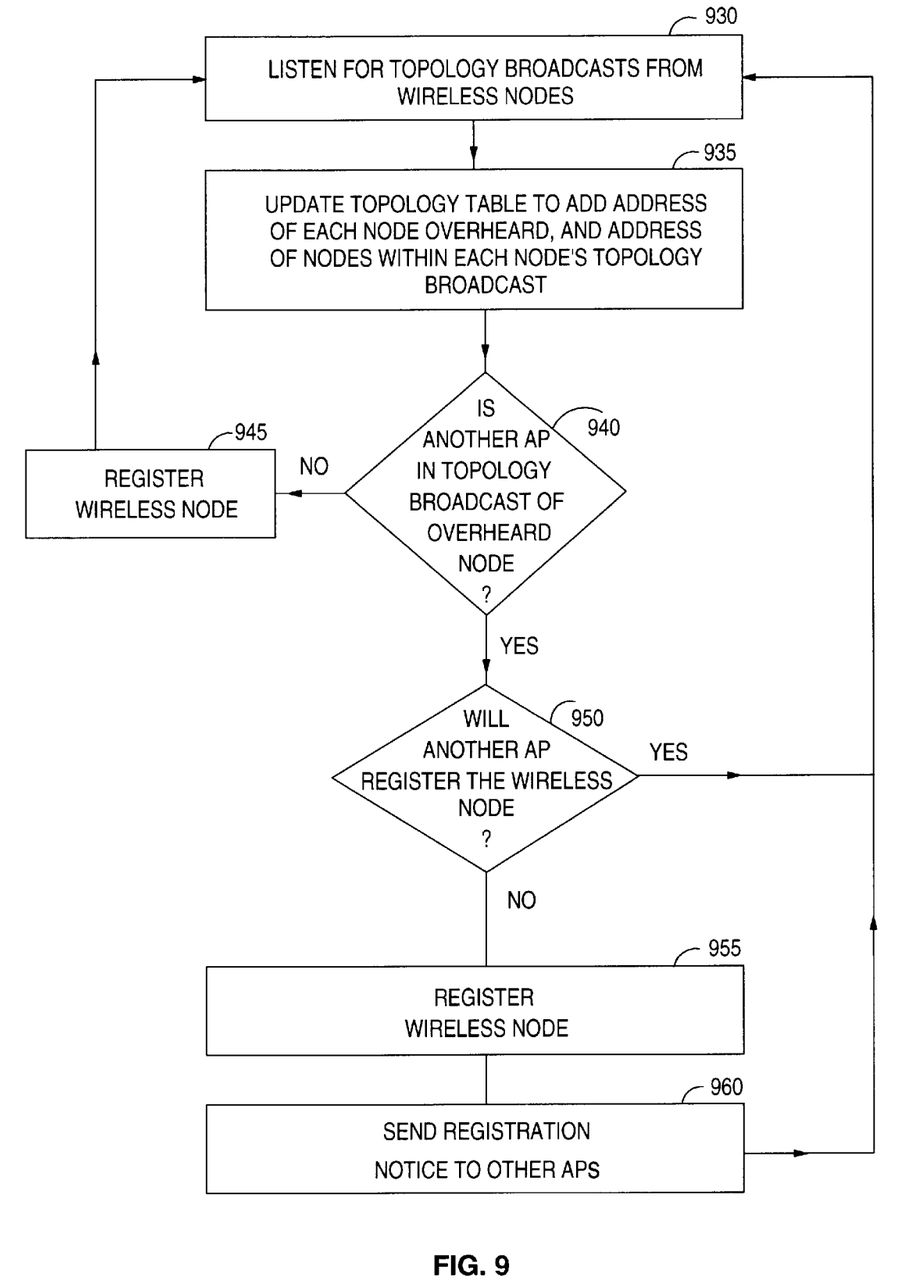
FIG. 9 is a flow chart illustrating how an internetworking node (AP) responds to receiving a topology broadcast.

FIG. 9 is a flow chart illustrating the steps taken by an internetworking node upon receiving a topology broadcast. As shown at step 930 the internetworking node listens for topology broadcasts from wireless nodes. Upon receipt, as shown at step 935 the AP updates its topology table to add the address of each node overheard, and the address of nodes within each node's topology broadcast. In other words for each node overheard, the AP adds to its topology table the address of the node, and the addresses within the node's address list/table. The internetworking node then determines at step 940 whether another AP is listed within a node's topology broadcast. In other words the AP determines whether the overheard wireless node is within range of any other AP. If the answer is negative the AP registers the wireless node as shown at step 945. If the answer is affirmative, the AP determines at step 950 whether another AP will register the wireless node. As previously discussed this depends on a predetermined hierarchy, for example the AP compares its address to the address of any other AP within the topology broadcast, and will only register the node if its address is smaller than any other AP address. If the node determines that no other AP will register the wireless node, the AP will then registers the wireless node as shown at step 955 and will then send a registration notice on the wired LAN to other APs, as shown at step 960 in order to notify any AP which had previously registered the wireless node to deregister the wireless node.

It will be apparent that many other changes may be made to the illustrative embodiments, while falling within the scope of the invention and it is intended that all such changes be covered by the claims appended hereto.

We claim:

1. An internetworking node for use in a network including a plurality of wireless nodes and wired nodes, said internetworking node comprising:

means to send data to the wireless nodes and to receive data from the wireless nodes;

means to send data to the wired nodes and to receive data from the wired nodes;

means to recognize and store received data which comprises messages from at least one of the wireless node containing information as to the network address of said at least one of the wireless node and other nodes from which said at least one of the wireless node can receive data;

means to cause said sending means periodically to broadcast information as to the network address of the internetworking node;

means to intercept data transmission from a first wireless node to a second wireless node; means to access stored messages from said second wireless node; means to determine from said stored messages whether said second wireless node had received data from the first wireless node within a period of time prior to a last broadcast message sent by the second wireless node, and means for forwarding the intercepted data transmission if the message indicates that the second wireless node has not received data from the first wireless node during the period of time.

2. A method for internetworking between wireless nodes comprising the steps of:

(a) sending and receiving data between wireless nodes and internetworking nodes;

(b) recognizing and storing received data which comprises a message from at least one other wireless node containing information as to the address of such other wireless node, (c) broadcasting, by each wireless node, at the end of a period its own network address and a list of the network addresses of any other wireless nodes from which it has received a message within the period;

(d) clearing, by each wireless node, the entire list of network addresses after performance of step (c);

(e) recognizing and storing, by said internetworking nodes received data which comprises broadcast messages from wireless nodes containing information as to the network address of each such node and the other nodes from which it has received said message within said period;

storing the address of wireless nodes for wireless nodes which an internetworking node has received a broadcast during the period;

storing the list which each of the said wireless node also broadcasts; and registering, some, none, or all of these wireless nodes.

3. A method as claimed in claim 2, comprising additional steps of establishing a hierarchy of internetworking nodes, and causing each internetworking node not to register wireless nodes which have broadcast a message confirming that they have received identification information from that internetworking node, if such wireless node also broadcasts a message showing that it has received identification information from a internetworking node more senior in the hierarchy.

4. A method as claimed in claim 2, comprising additional steps of recognizing data transmitted by a registered wireless node and which is addressed to a node which is not listed; and retransmitting of such data by the internetworking node by wireless transmission if the destination node is a wireless node from which the internetworking node has received a broadcast during the period and retransmitting such data on the wired LAN otherwise.

5. A wireless node for use in a network comprising:

means in said wireless node to send messages to other wireless nodes and receive messages from said other wireless nodes;

a memory for maintaining a list of network addresses of other wireless nodes within a predetermined range;

means to recognize and store in said memory the network addresses of other wireless nodes contained in the receive messages;

means to cause said sending means at the end of a period to broadcast its own address and the list of network addresses;

means for deleting the entire list of network addresses maintained in said memory after broadcasting its own address and the list of network addresses; and means for reconstructing a new list of network addresses, in the memory, from messages received from the nodes in an ensuing period.

6. An internetworking node for use in a network including a plurality of wireless nodes including:

means to send messages to the wireless nodes and to receive messages from the wireless nodes;

a memory for storing a topology table, said topology table including a first tier column in which network addresses of wireless nodes transmitting topology broadcast messages received by said at least one internetworking node are being stored, a second tier column for storing network addresses of other wireless nodes contained in said topology broadcast messages and an indicia column indicating if the network address of a wireless node is registered to said internetworking nodes;

means to analyze the topology broadcast messages and enter in said topology table the network addresses of the wireless node transmitting the topology broadcast message and network addresses of other nodes contained in the topology broadcast messages; and means for analyzing the topology table or broadcast messages received at said internetworking node to determine if a sending wireless node is to be registered or not registered to said internetworking node.

7. The internetworking node of claim 6 further including means for marking registration status of wireless node in the indicia column.

8. The internetworking node of claim 6 further including means for broadcasting the address of the internetworking node.

9. An internetworking node as claimed in claim 6 further comprising means to cause said internetworking node sending means at least once during each said period to broadcast identification information identifying the internetworking node.

10. The method as claimed in claim 9 further comprising the following steps carried out by the internetworking node:

storing the address of wireless nodes for wireless nodes which the internetworking node has received a broadcast during the period;

storing the list which each of the said wireless nodes also broadcasts; and registering, some, none, or all of those wireless nodes.

11. An internetworking node as claimed in claim 10 further including means for marking in the indicia column registration status of the sending wireless node;

means for recognizing messages on the wired network which are addressed to a node which has been registered; and means for wireless retransmission of such messages to that node.

12. An internetworking node as claimed in claim 10 further including means to recognize information transmitted by a registered wireless node to a wireless node which is not listed in the topology table; and means for causing the means which send messages to the wireless node to send said information to the wireless node which is not listed in the topology table if the internetworking node had received a broadcast from the wireless node, not listed in the topology table, within a specified time interval.

13. The internetworking node as claimed in claim 12 further including means to send messages to the wired LAN and to receive messages from the wired LAN with said means being operable to send information to the wired LAN if said information was not sent by wireless transmission.

14. A method for communicating between wireless nodes comprising the steps of:

a) sending and receiving messages between the wireless nodes;

b) maintaining in at least one of a first group of the wireless nodes, a node address list identifying addresses of wireless nodes obtained from broadcast messages received in said selected ones of wireless nodes;

c) periodically broadcasting from each of the selected ones of the wireless nodes a topology broadcast message containing its own address and addresses of nodes recorded in its node address list;

d) upon conclusion of a broadcast, each broadcasting wireless node deleting its entire node address list;

e) upon conclusion of a deletion, each wireless node reconstructing a new node address list from received broadcast messages;

f) building and maintaining in at least one of a second group of wireless nodes a topology table containing information on selected ones of wireless nodes within a predetermined range of said at least one of said second group of wireless nodes and information on other wireless nodes which the selected ones of wireless nodes can hear; and said at least one of the second group of wireless nodes using the information in its topology table to determine whether to intervene or not intervene in delivery of messages between wireless nodes.

15. The method of claim 14 further including the step of:

structuring the topology table to include a first tier column in which addresses of the wireless nodes within the predetermined range of said at least one of said second group of wireless nodes are placed, a second tier column in which addresses of wireless nodes within hearing distance of wireless nodes in the first tier column are placed and a registration column having identifying wireless node register or not register to the at least one of the second group of wireless nodes.

16. The method of claim 15 further including the steps of selecting the addresses stored in the first tier column and the second tier column from received topology broadcast messages; and correlating information in the topology broadcast messages and information in the topology table to determine the registration status of a wireless node.

17. A network including:

a wired LAN;

a plurality of wireless nodes;

a plurality of internetworking nodes connected to the wired LAN: wherein at least one of the internetworking nodes includes means to send messages to the wireless nodes and to receive messages from the wireless nodes;

a memory for storing a topology table, said topology table including a first tier column in which network address of wireless nodes transmitting topology broadcast messages received by said at least one internetworking node are being stored, a second tier column for storing network addresses of other wireless nodes contained in said topology broadcast messages and an indicia column indicating if the network address of a wireless node is registered to said internetworking nodes;

means to analyze the topology broadcast messages and enter in said topology table the network addresses of the wireless node transmitting the topology broadcast message and network addresses of other nodes contained in the topology broadcast messages;

means for analyzing the topology table or broadcast messages received at said internetworking node to determine if a sending wireless node is to be registered or not registered to said internetworking node;

means for establishing a hierarchy of internetworking nodes; and means for causing said at least one internetworking node not to register wireless nodes which have broadcast a message confirming that they have received identification information from that internetworking node, if such wireless node also broadcasts a message showing that it has received identification information from an internetworking node more senior in the hierarchy.

* * * * *